(12) United States Patent
Numa (10) Patent No.: US 6,633,267 B2
(45) Date of Patent: Oct. 14, 2003

(54) HEAD-MOUNTED DISPLAY CONTROLLING METHOD AND HEAD-MOUNTED DISPLAY SYSTEM (75) Inventor: TakayuKi Numa, Tokyo (JP)

(73) Assignee: NEC Corporation, Tokyo (JP)

( * ) Notice: Subject to any disclaimer, the term of this patent is extended or adjusted under 35 U.S.C. 154(b) by 65 days.

(21) Appl. No.: 09/748,844

(22) Filed: Dec. 27, 2000

(65) Prior Publication Data

US 2001/0006376 A1 Jul. 5, 2001

(30) Foreign Application Priority Data

Dec. 28, 1999 (JP) .......................................... 11-373648

(51) Int. Cl.⁷ ................................................. G09G 5/00
(52) U.S. Cl. ................................ 345/7; 345/8; 359/630
(58) Field of Search ........................... 345/7, 8; 359/13, 359/14, 630–632

(56) References Cited

U.S. PATENT DOCUMENTS 5,917,460 A * 6/1999 Kodama ........................ 345/8
6,177,966 B1 * 1/2001 Masuda et al. ................ 349/8
6,226,055 B1 * 5/2001 Koba ............................ 349/5

FOREIGN PATENT DOCUMENTS

| JP | 9-27970 | 1/1997 |
| JP | 9-211377 | 8/1997 |
| JP | 10-73783 | 3/1998 |
| JP | 10-291188 | 11/1998 |
| JP | 11-177907 | 7/1999 |
| JP | 68600310 | 12/2002 |

* cited by examiner

Primary Examiner—Amare Mengistu
Assistant Examiner—Tom Sheng
(74) Attorney, Agent, or Firm—Scully, Scott, Murphy & Presser (57) ABSTRACT The present invention provides an HMD system for reducing a harmful influence on eyes and for providing enhanced presence. A screen display portion is moved by means of a driving mechanism based on a control signal output from a video playback device. Furthermore, the screen display portion 2 is moved according to how a wearer has reacted. Therefore, an intention of a producer of video software can be reflected in the HMD. Therefore, even in a case of a two-dimensional video without bidirectional property and with inflexible video unfolding, enhanced presence can be reliably provided to the wearer. Because a relationship between positions of eyeballs and the screen display portion is not fixed, the harmful influence on eyesight can be reduced. Furthermore, because the system has a driving mechanism 3, a gyro sensor portion 4, and a control portion 5 for the screen display portion 2, the screen display portion can be moved arbitrarily in any direction and the above control can be carried out accurately.

9 Claims, 5 Drawing Sheets

HEAD-MOUNTED DISPLAY CONTROLLING METHOD AND HEAD-MOUNTED DISPLAY SYSTEM

BACKGROUND OF THE INVENTION

1. Field of the Invention

The present invention relates to a head-mounted display controlling method by which a user can see an image by wearing a head-mounted display on his/her head and a head-mounted display system for carrying out the method.

2. Prior Art

In recent years, various systems (head mounted displays and hereafter referred to as HMDs) in which an image display device is mounted to a head of a user and the wearer can see a displayed image throughout his/her field of vision have been proposed and gone into actual use. Such an HMD is an extremely promising system if living space is limited, because it is possible to artificially experience and feel a large screen by the HMD though the HMD is small-sized.

However, in the prior-art HMD, a screen display portion and the user's eyeballs are fixed with a certain physical position relationship between them and a focal length is constant. As another prior art, there is a technique in which a movement signal is fed back and taken in by an analyzing device and reflected in contents of the screen if the HMD wearer moves his/her head.

However, any of the above pieces of prior art did not give consideration to the following points. In other words, the screen display portion and the eyeballs are fixed with a certain physical position relationship between them in the prior-art system, which causes not only fatigue of wearer's eyes but also weakens wearer's eyesight and has a harmful influence on the eyes. In order to avoid this problem, there is proposed an HMD with a structure which is not closed and by which the user can easily see the outside world. However, the user cannot immerse himself/herself in the image and the presence is degraded as compared with a closed HMD.

Although a producer of an image is making a great effort to enhance presence in contents of the image, such an effort merely results in two-dimensional expression (two-dimensional image) and there is a limitation to expression of presence. Therefore, there is proposed three-dimensional images made by utilizing an optical illusion. However, watching today's three-dimensional image causes more fatigue than watching the two-dimensional image and some percentage of audiences cannot see a video as a two-dimensional one in reality.

In another prior-art system, a movement signal is fed back to contents of an image when the wearer moves his/her head. This is suitable as means for moving in virtual space according to calculation by a computer and has flexible unfolding in which videos are created at any time by calculation. However, this is not compatible with conventional video contents (e.g., a normal film) that unfold inflexibly as the producer determined.

With the above prior-art problems in view, it is an object of the present invention to provide a head-mounted display system for reducing a harmful influence on a wearer's eyes, providing enhanced presence, and bringing bidirectional property into contents of inflexible screen unfolding.

SUMMARY OF THE INVENTION

To achieve the above object, the first aspect of the controlling method of the present invention is a head-mounted display controlling method for causing a screen display portion provided in a head-mounted display apparatus to move, wherein the screen display portion is moved forward or backward in front of a wearer of the apparatus when an image signal is input to the screen display portion and a predetermined time period has passed.

When a normal film or TV that does not include a control signal is being watched or when business software such as a spreadsheet program is running, by moving the screen display portion forward (or backward) after the predetermined time period has passed as described above, it is possible to prevent the wearer from seeing the image at a constant distance for many hours and to reduce a harmful influence on the wearer's eyes.

A second aspect of the controlling method of the present invention is a head-mounted display controlling method for causing a screen display portion provided in a head-mounted display apparatus to move based on a control signal output from a video playback device, wherein the screen display portion is selectively moved in any one of directions selected from a lateral direction, a vertical direction, and a diagonal direction that is synthesized by the lateral direction and the vertical direction with keeping a distance between a wearer of the apparatus and the screen display portion at a constant value.

With the second head-mounted display controlling method of the invention, because the screen display portion moves with the distance between the wearer and the screen display portion maintained at a constant value, an intention of the producer of the video software can be reflected. As a result, although the video is two-dimensional, enhanced presence can be reliably provided to the wearer.

A third aspect of the controlling method of the present invention is a head-mounted display controlling method for causing a screen display portion provided in a head-mounted display apparatus to move based on a control signal output from a video playback device, wherein the screen display portion is selectively moved in any one of directions selected from a lateral direction, a vertical direction, and a diagonal direction that is synthesized by the lateral direction and the vertical direction with keeping a distance between a wearer of the apparatus and the screen display portion at a constant value or moved forward or backward in front of the wearer.

With the third head-mounted display controlling method of the invention, not only the screen display portion moves with the distance between the wearer and the screen display portion maintained at a constant value but also the screen display portion moves forward or backward on the straight line between the wearer and the screen display portion. Therefore, a range of movement of the screen display portion can be expanded. As a result, the harmful influence on the eyes can be further reduced and the intention of the producer can be further reflected. As a result, it is possible to provide enhanced presence to the wearer.

A first aspect of the head-mounted display system of the present invention is a head-mounted display system for causing an image signal from a video playback device to be displayed on a screen display portion provided in a head-mounted display apparatus, the head-mounted display system comprising: a driving means for moving the screen display portion forward or backward in front of a wearer of the apparatus; and a control means for controlling so as to move the screen display portion forward or backward by means of the driving means when the image signal is input to the head-mounted display apparatus at every time when a predetermined time period has passed.

A second aspect of the head-mounted display system of the present invention is a head-mounted display system for causing an image signal from a video playback device to be displayed on a screen display portion provided in a head-mounted display apparatus and for causing the screen display portion to move based on a control signal output from the video playback device, the head-mounted display system comprising: a driving means for moving the screen display portion in any one of directions selected from a lateral direction, a vertical direction, and a diagonal direction that is synthesized by the lateral direction and the vertical direction with keeping a distance between a wearer of the apparatus and the screen display portion maintained at a constant value; a detecting means for detecting a movement of the head-mounted display apparatus; and a control means for controlling so as to move the screen display portion by means of the driving means based on a detection signal output from the detecting means and the control signal output from the video playback device.

A third aspect of the head-mounted display system of the present invention is a head-mounted display system for causing an image signal from a video playback device to be displayed on a screen display portion provided in a head-mounted display apparatus and for causing the screen display portion to move based on a control signal output from the video playback device, the head-mounted display system comprising: a driving means for moving the screen display portion in any one of directions selected from a lateral direction, a vertical direction, and a diagonal direction that is synthesized by the lateral direction and the vertical direction with keeping a distance between a wearer of the apparatus and the screen display portion at a constant value and for moving the screen display portion forward or backward in front of the wearer; a detecting means for detecting movement of the head-mounted display apparatus; and a control means for controlling so as to move the screen display portion by means of the driving means based on a detection signal output from the detecting means and the control signal output from the video playback device.

In a fourth aspect of the head-mounted display system of the present invention, the control means has a means to output a feedback signal to the video playback device based on a detection result of the detecting means and to carry out the display of the image based on control signal output from the video playback device.

In a fifth aspect of the head-mounted display system of the present invention, the control means controls a movement of the screen display portion at a predetermined speed.

In a sixth aspect of the head-mounted display system of the present invention, the control means has a means for communicating with the video playback device in a bidirectional based on detection result obtained by the detecting means.

DETAILED DESCRIPTION OF THE PREFERRED EMBODIMENTS

Figure 1:
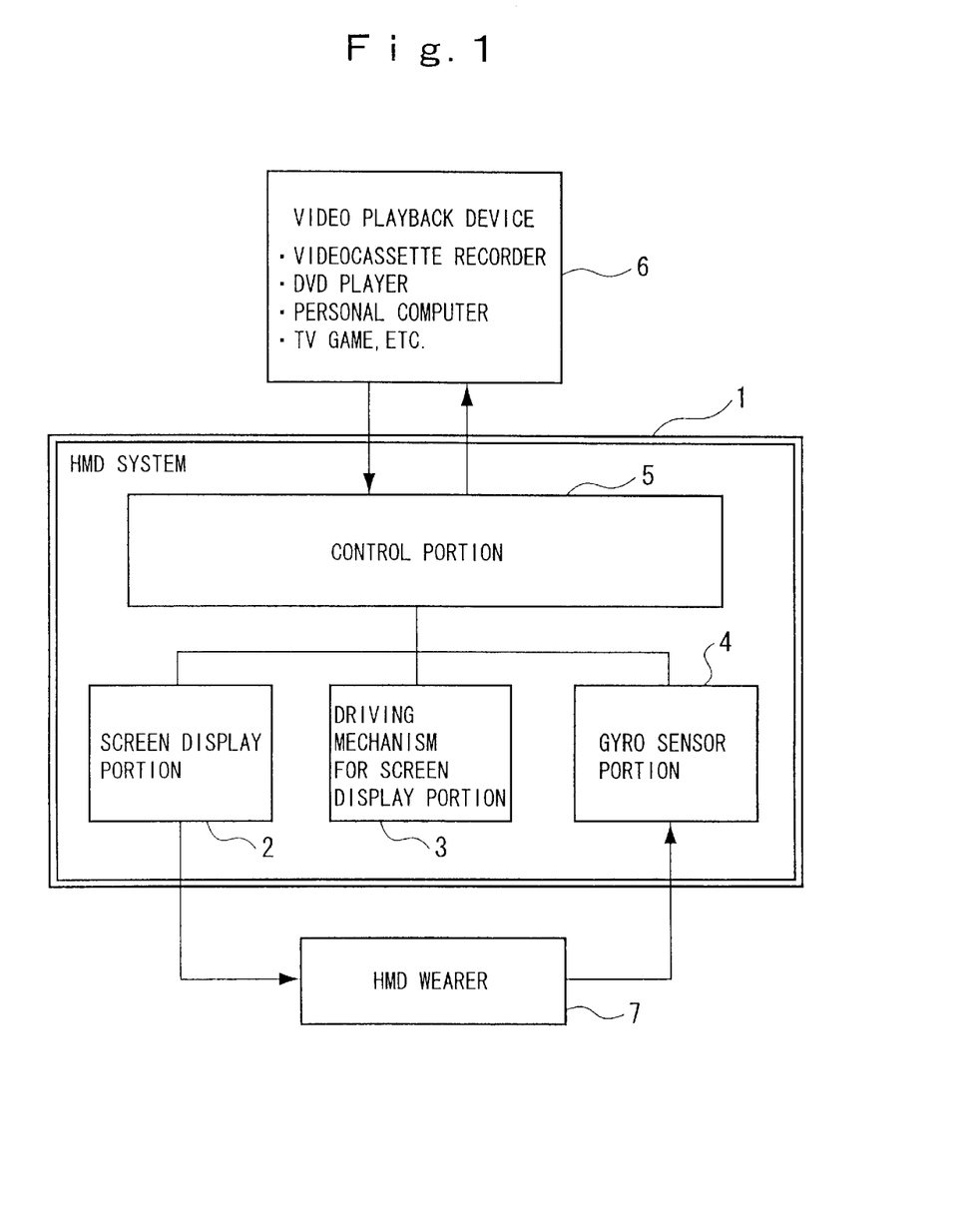
FIG. 1 is a general explanatory view showing an embodiment of an HMD system for carrying out a method of the present invention.
Figure 2:
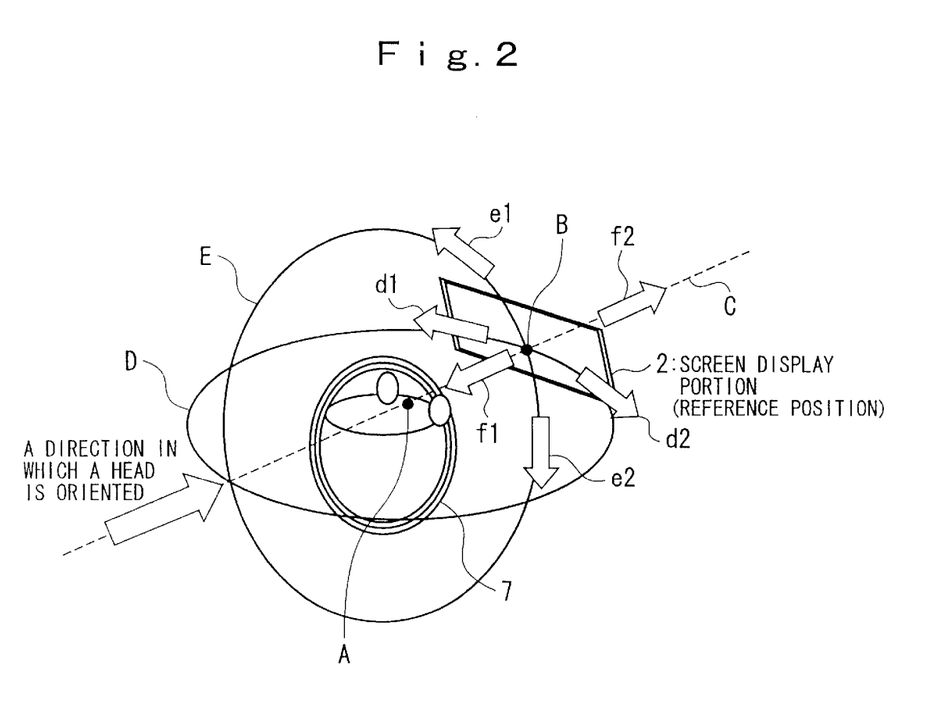
FIG. 2 is an explanatory view showing an overview of the method of the present invention and movement of a screen display portion of the HMD system with respect to a wearer.
Figure 3:
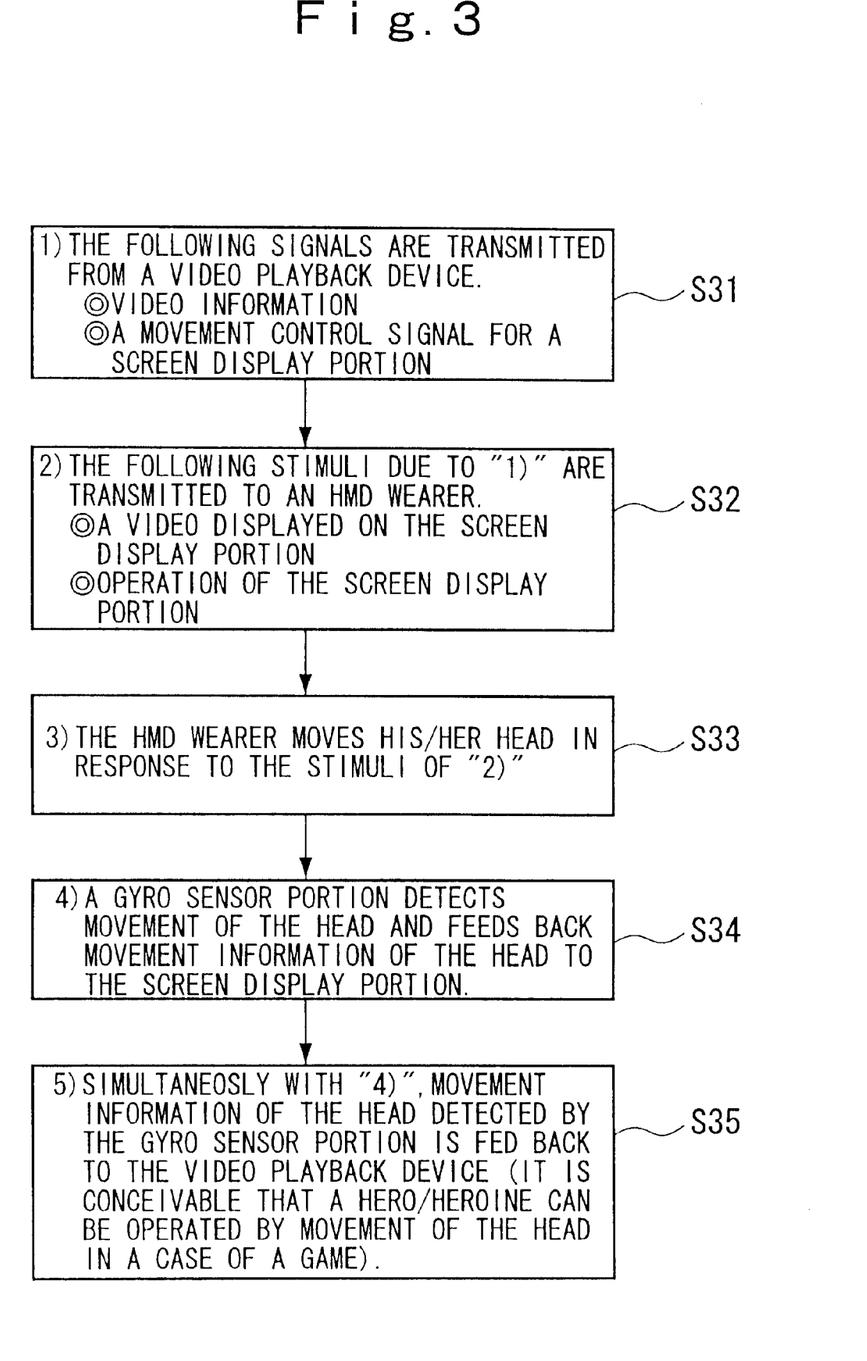
FIG. 3 is a flowchart of a general procedure showing an embodiment of the method of the present invention.

Embodiments of the present invention will be described below by reference to the accompanying drawings. FIG. 1 shows an embodiment of a head-mounted display system (hereafter simply referred to as an HMD system) for carrying out a method according to the invention. FIG. 2 is a drawing for explaining movement of a screen display portion. FIG. 3 is a schematic flowchart of control of the HMD system.

As shown in FIG. 1, the HMD system 1 of the present embodiment includes a screen display portion 2, a driving mechanism 3 for moving the screen display portion 2, a gyro sensor portion 4, and a control portion 5, controls the screen display portion 2 according to a control signal output from a video playback device 6 and a reacting state of a wearer 7 of the HMD when the wearer 7 is observing an image from the video playback device 6. Detail of the control signal output from the video playback device 6 will be described later.

Respective portions of the HMD system 1 will be described below. The screen display portion 2 is mounted in the HMD and provides the same image to both eyes of the wearer 7 as shown in FIG. 2 in the embodiment. Specifically, the screen display portion 2 has liquid crystal elements and an eyepiece disposed in front of the liquid crystal elements.

The driving mechanism 3 is also built into the HMD so as to move the screen display portion 2 in any of a horizontal direction, a vertical direction, and a plane direction between them. In other words, when the wearer 7 wears the HMD, the driving mechanism 3 is formed such that, in a state in which a distance between an intermediate position A between both eyes of the wearer 7 and a center position B of the screen display portion is maintained at a constant value, the center position B of the screen display portion 2 can move in any of a lateral direction, a vertical direction, and a diagonal direction that is between both the lateral and vertical directions about the center position A between both the eyes as a center. Therefore, the screen display portion 2 moves in a leftward direction d1 and a rightward direction d2 along a polar coordinate system D on a horizontal plane and in an upward direction e1 and a downward direction e2 along a polar coordinate system E on a vertical plane as shown in FIG. 2. Although it is not shown, the screen display portion 2 can also move in the diagonal direction between the lateral direction and the vertical direction. Here, because the wearer 7 is wearing the HMD and seeing the image, an amount of movement of the screen display portion 2 by the driving mechanism 3 may be such a distance that both the eyes can easily follow the movement of the screen display portion 2 when the wearer 7 is wearing the HMD, e.g., an amount as small as about a few mm at the maximum actually. Such a movement amount can be achieved even in small space in the HMD.

Furthermore, the driving mechanism 3 is formed to move the screen display portion 2 toward or away from the wearer 7 on a normal C connecting the center position A between both the eyes of the wearer 7 and the center position B of the screen display portion 2, i.e., in a forward direction f1 and a backward direction f2 in front of the wearer's eyes. A movement amount in this case is also about a few mm similarly to the above case. The gyro sensor portion 4 detects movement of the HMD itself by movement of a head of the wearer 7, independently detects movements of the head when the head of the wearer 7 moves horizontally and when the head moves vertically, and outputs control signals to the control portion 5.

The control portion 5 controls the driving mechanism 3 based on the control signal from the video playback device 6. The control portion 5 also controls the driving mechanism 3 by movement of the HMD itself when the head of the wearer 7 moves. Therefore, the driving mechanism 3 is controlled not only by the control signal but also by detection signals of the gyro sensor portion 4. The control portion 5 is programmed to control the driving mechanism 3 according to preset program contents.

The control portion 5 independently controls the driving mechanism 3 based on a program stored in a memory installed in itself. In this memory, information for independently controlling the driving mechanism 3 when image information is simple like in the cases of normal films, TV, and a spreadsheet program is stored. The control signals for the screen display portion 2 is control information that is not included in normal film software but is deliberately included in the screen display portion 2 so as to enhance presence and the like in image software by a producer, includes elements formed of "whether the HMD wearer accepts a feedback" as a condition (1), screen displacement ($\theta v1$, $\theta h1$, x1), screen speed (a, b, c), HMD displacement ($\theta v2$, $\theta h2$, x2) and the like as a condition (2), for example, and is included in special film software, game software, and the like.

Here, the screen displacement ($\theta v1$, $\theta h1$, x1) refers to a sequence indicating movement of the screen display portion 2. $\theta v1$ represents an angle of the polar coordinate system in the vertical direction in FIG. 2 (a reference position is 0° and an upper part is positive), $\theta h1$ represents an angle of the polar coordinate system in the horizontal direction in FIG. 2 (a reference position is 0° and a left part is positive), and x1 represents a position in a forward/backward direction (a reference position is 0 and a direction to be closer to the wearer is positive). The screen speed (a, b, c) refers to a speed of movement of the screen display portion 2. "a" represents a speed (angular speed) in the vertical direction, "b" represents a speed (angular speed) in the horizontal direction, and "c" represents a speed in the forward/backward direction. Therefore, the screen display portion 2 moves toward a position determined by the "screen displacement" and at a speed determined by the "screen speed".

The HMD displacement ($\theta v2$, $\theta h2$, x2) defines a degree of displacement to which the screen displacement corresponds for the wearer 7 when the feedback of the wearer 7 is received. Structurally, the HMD can cause the screen display portion 2 to move only in a limited range. However, it is possible that actual movement of the screen display portion 2 through 5°, for example, can be defined as movement through 90° by intention of the producer. As a result, a correlation can be defined in which angles are balanced with each other when displacement of the screen display portion 2 through 5° is canceled and the screen display portion 2 is returned to the reference position, which is equivalent to movement of the wearer 7 through 90° and returning to the original position.

Although the control signal is distinguished from the image signal in the embodiment, by the control signal may be superimposed on the image signal or a voice signal if the video playback device 6 can recognize such a signal. Therefore, in the HMD system 1 of the embodiment, by the control signal from the video playback device 6 and by the detection signal from the gyro sensor portion 4, the control portion 5 properly and selectively moves the screen display portion 2 by means of the driving mechanism 3 in any of the lateral, vertical, diagonal, forward, and backward directions.

Next, in connection with movement of the HMD system 1 of the embodiment, an embodiment of a controlling method according to the invention will be described according to a flowchart shown in FIG. 3. First, an output of the video playback device 6 and an input of the HMD system 1 are connected and the wearer 7 is wearing the HMD on his/her head such that he/she can see the image. The center position B of the screen display portion 2 in the HMD is set in a reset position.

If the power to both the device and system is turned on, the image signal, voice signal and control signal for the screen display portion 2 are respectively output from the video playback device 6 (step 31), the control portion 5 causes an image to show up on the screen display portion 2 or causes the screen display portion 2 to move based on the signals (step 32), and the wearer moves his/her head in response to the stimulus (step 33).

As a result, the gyro sensor portion 4 detects movement of the HMD and outputs the movement to the control portion 5 (step 34). Therefore, the control portion 5 causes the screen display portion 2 to move by means of the driving mechanism 3 based on the input signal. The control portion 5 outputs the movement of the HMD also to the video playback device 6 based on the detection result of the gyro sensor portion 4 if necessary when bidirectional communication is possible between the video playback device 6 and the HMD system 1 in the image software (step 35) and causes processing such as operation of a person on the screen and reset of the game to be carried out.

As described above, because the screen display portion 2 is moved based not only on the control signal output from the video playback device 6 by means of the driving mechanism 3 but also on how the wearer 7 has reacted in the present invention, an intention of the producer of video software can be reflected. Although the video is two-dimensional, enhanced presence can be reliably provided to the wearer 7 because the screen display portion 2 can be caused to move in a three-dimensional manner. Furthermore, if the bidirectional communication is possible like in game software, control according to reaction of the wearer 7 is possible.

Because the HMD system 1 for carrying out the above invention includes the driving mechanism 3 for moving the screen display portion 2 on any one plane of the horizontal plane, vertical plane, and space between both the planes while maintaining the distance between the wearer 7 and the screen display portion 2 at a constant value and for moving the screen display portion 2 in forward or backward on a straight line between the wearer 7 and the screen display portion 2 in the HMD, the gyro sensor portion 4 for detecting movement of the HMD itself, and the control portion 5 for controlling movement of the screen display portion 2 by means of the driving mechanism 3 based on the detection signal from the gyro sensor portion 4 and the control signal from the video playback device 6, the screen display portion 2 can be moved arbitrarily in any direction and the above method can be carried out accurately.

Figure 4:
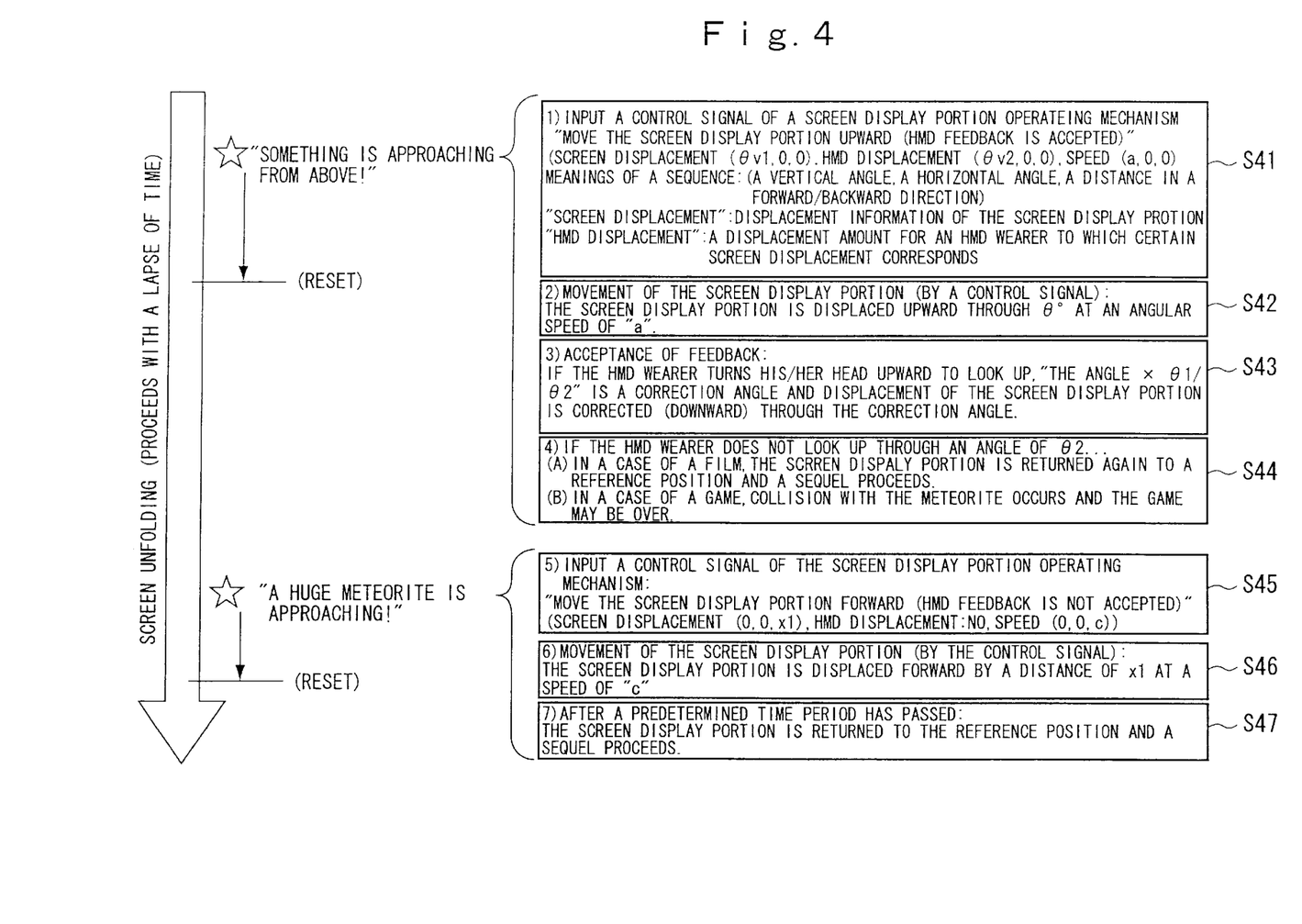
FIG. 4 is a flowchart for explaining another embodiment of the method of the present invention.
Figure 5:
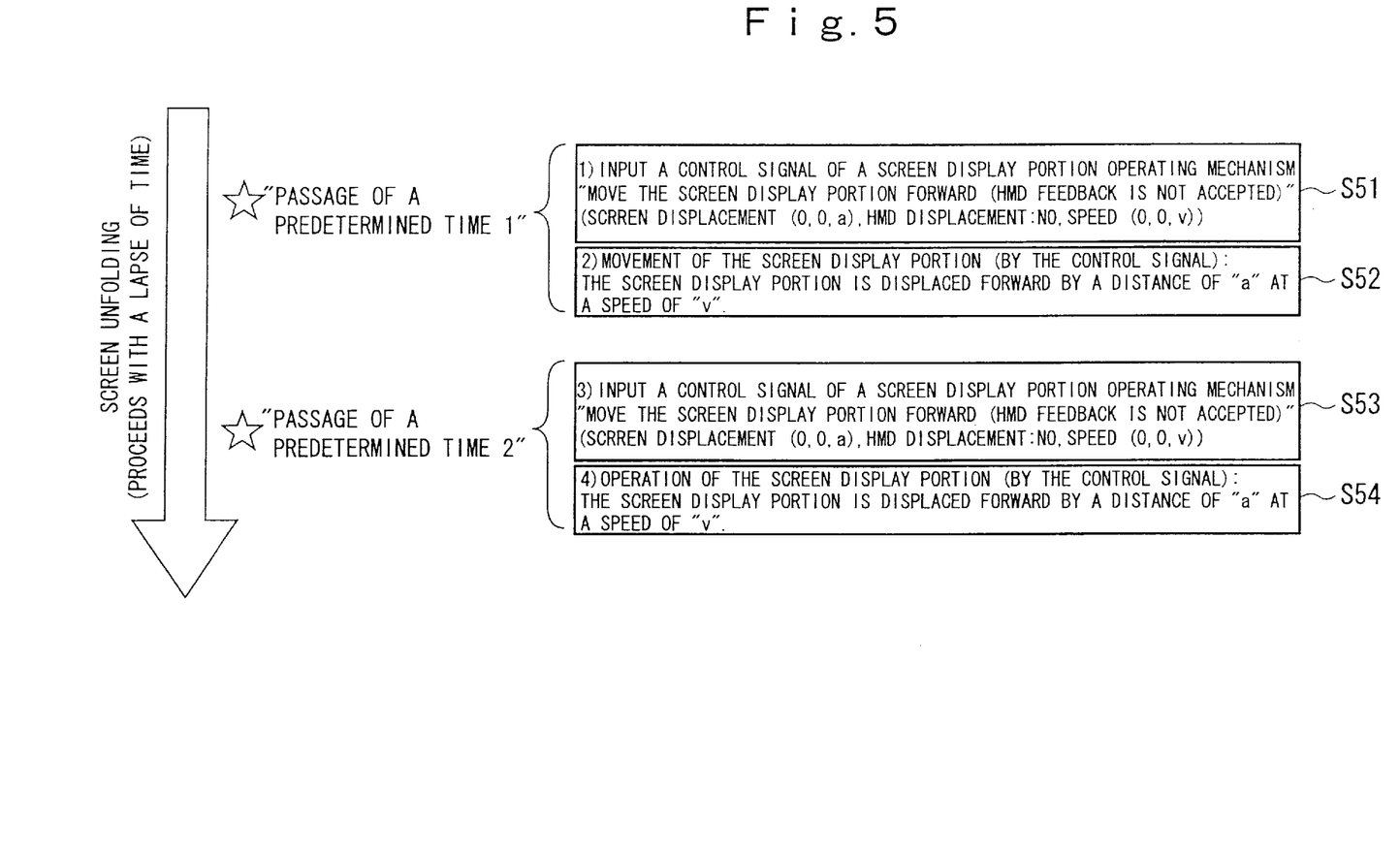
FIG. 5 is a flowchart for explaining yet another embodiment of the method of the present invention.

Next, another embodiment of the method of the invention will be described based on FIGS. 4 and 5. In FIG. 4, the wearer 7 is seeing the image showing up on the screen display portion 2. For example, in a scene in which an image, "Something is approaching from above" is showing up as shown in FIG. 4, the above conditions (1) and (2) are input as control information (step 41). If the control portion 5 accepts the above conditions, the following processing is carried out.

In other words, the control portion 5 displaces the screen display portion 2 upward through $\theta 1°$ at an angular speed of "a" according to the conditions defined in the step 41 (step 42). Thus, the wearer 7 visually recognizes that the screen display portion 2 has been displaced upward and turns his/her head up as natural reaction to this recognition. If the head is turned up, the gyro sensor portion 4 detects it and outputs it to the control portion 5 (step 43). In the control portion 5, a degree of correction that should be made to screen displacement with respect to the reference position of the screen display portion 2 is calculated based on a correlation between the screen displacement and HMD displacement and the displacement of the screen display portion 2 is returned to an original displacement based on data obtained by the calculation (step 43).

Here, if the detected data by the gyro sensor portion 4 is (θv3, θh3, x3), for example, a correcting amount (θv4, θh4, x4) of the screen displacement is as follows.

$$θv4=(θv1/θv2)×θv3$$

$$θh4=(θh1/θh2)×θh3$$

$$x4=(x1/x2)×x3$$

In the unlikely event that the wearer 7 does not turn his/her head up in the above process, the screen display portion 2 is reset and returned automatically to the reference position after a predetermined time period set in advance by the producer in software such as a film (step 44). Otherwise, in the case of software such as a TV game in which bidirectional communication between the control portion 5 and the video playback device 6 is possible, a penalty for not having turned his/her head up is counted and the control portion 5 sends a signal to this effect to the video playback device 6 to make the game over (step 44). The above reference position is a position that faces the HMD wearer 7 straight and a position where the normal C passing through the center position B of the screen display portion 2 intersects at right angles a side parallel to a horizontal line and connecting both the eyes as shown in FIG. 2.

Next, a case in which the wearer 7 is facing upward and an image, "A huge meteorite is approaching" is displayed as the next image as shown in FIG. 4 will be described. In this case, by sending a control signal for moving the screen display portion 2 closer from the video playback device 6, dynamism of the approaching meteorite is produced such that the wearer 7 can enjoy the dynamism in a settled state.

In other words, acceptance of the feedback of the above condition (1) is not carried out. If the screen displacement (0, 0, x1), no HMD displacement, angular speed (0, 0, c) are input in the above condition (2) (step 45), the control portion 5 displaces the screen display portion 2 by means of the driving mechanism 3 toward a position of x1 at a speed of "c" (step 46), which results in forward movement of the screen display portion 2. Then, the control portion 5 resets the screen display portion 2 to return the screen display portion 2 to the reference position after a predetermined time period set by the producer has passed (step 47).

As described above, because the screen display portion 2 is moved based not only on the control signal output from the video playback device 6 by means of the driving mechanism 3 but also on how the wearer 7 has reacted in the present invention, an intention of the producer of video software can be reflected. Although the video is two-dimensional, enhanced presence can be reliably provided to the wearer 7.

Furthermore, it is possible to impose a penalty on the wearer 7 when the wearer 7 moves in a way the producer did not intend and such movement itself provides a stimulus to the wearer. Even if a distance between the eyes of the wearer 7 and the screen display portion 2 is constant, because the screen display portion 2 moves in any of the lateral, vertical, and diagonal directions, a harmful influence on the eyes of the wearer 7 can be reduced reliably as compared with a prior-art HMD. Furthermore, because the screen display portion 2 also moves forward and backward to change the distance between the wearer 7 and the screen display portion 2, the harmful influence on the eyes of the wearer 7 can be further reduced.

Next, a case in which a normal film or TV without the control signal is watched or a spreadsheet program is used will be described by reference to FIG. 5. If the wearer 7 watches the normal film, for example, that does not have the control signal on the screen display portion 2 and a predetermined time period has passed in this state, the control portion 5 reads in a program of memory stored inside (step 51), does not receive feedback of the above condition (1) according to the program, and causes the screen display portion 2 to move by means of the driving mechanism 3 based on data of screen displacement (0, 0, a), no HMD displacement, and a speed (0, 0, V) as the condition (2) (step 52). In other words, the screen display portion 2 moves forward at a speed of "v" by a distance "a" after a predetermined time period has passed. In this case, the screen display portion 2 may be also move backward.

If a further predetermined time period has passed, the control portion 5 reads in the conditions (1) and (2) similar to the above conditions (step 53) and moves the screen display portion 2 forward at a speed of "v" and by a distance of "a" again (step 54). In this case, the screen display portion 2 may also move to return to an original position.

As described above, because the screen display portion 2 is moved forward (or backward) after the predetermined time period has passed when the normal film or TV that does not include the control signal is being watched or business software such as the spreadsheet program is running in the method of the invention, it is possible to prevent the wearer 7 from seeing the screen at a constant distance for many hours, thereby reducing the harmful influence on the eyes of the wearer 7.

If the video has the control signal for the screen display portion 2 as shown in FIG. 4 and if movement according to the control signal conflicts with the state for protecting eyesight, it is possible that the wearer can decide which of them to give a higher priority. This choice may be set in advance by providing a selector switch (not shown) to the HMD.

Because the screen display portion 2 has to move only at least forward or backward as described above, the HMD system 1 of the present invention may have a simple structure and control can be also simplified.

Although the example in which the driving mechanism 3 can always move the screen display portion 2 in any of the horizontal, vertical, diagonal, forward, and backward directions to obtain extremely satisfactory effects has been described in the above embodiments, the normal film, TV, and the like can be controlled if the screen display portion 2 moves at least in the forward/backward direction. Even if the screen display portion 2 does not move in the forward/backward direction, if the screen display portion 2 moves in any of the horizontal, vertical, and diagonal directions, it is possible to easily deal with intention of the producer or the like and to reduce the harmful influence on the eyes of the wearer. Therefore, it can be advantageous in terms of manufacturing costs to properly select the structure depending on a kind of image software to be used. Although the screen display portion 2 shows the same video to both the eyes of the wearer 7 in the above embodiments shown in the drawings, the invention can be similarly applied to the HMD for unfolding independent videos for the left and right eyes. In this case, polar coordinate systems are respectively set for the left and right eyes, origins are respectively in positions for the left and right eyes, and reference positions are in positions respectively facing left and right eyeballs straight.

As described above, according to the method of the invention, because the screen display portion in the HMD is moved forward or backward or moved on any plane of the horizontal plane, vertical plane, and space between them while maintaining a distance between the wearer and the screen display portion at a constant value, the harmful influence on the eyes of the wearer can be reduced, enhanced presence can be provided, and bidirectional property can be brought into contents of inflexible screen unfolding.

When the wearer of the HMD is watching the image from the video playback device, the screen display portion is controlled according to the control signal output from the video playback device and the reacting state of the wearer in the system of the invention. Therefore, the above control can be carried out accurately.

What is claimed is:

1. A head-mounted display controlling method for causing a screen display portion provided in a head-mounted display apparatus to move based on a control signal output from a video playback device, wherein said screen display portion is selectively moved in any one of directions selected from a lateral direction, a vertical direction, and a diagonal direction that is synthesized by said lateral direction and said vertical direction, in response to said control signal from said video playback device, with keeping a distance between a wearer of said apparatus and said screen display portion at a constant value.

2. The head-mounted display controlling method according to claim 1, wherein movement of said screen display portion is carried out when said wearer's head is moved.

3. The head-mounted display controlling method according to claim 1, wherein said movement of said screen display portion is carried out at a predetermined speed.

4. A head-mounted display controlling method for causing a screen display portion provided in a head-mounted display apparatus to move based on a control signal output from a video playback device, wherein said screen display portion is selectively moved in any one of directions selected from a lateral direction, a vertical direction, and a diagonal direction that is synthesized by said lateral direction and said vertical direction, in response to said control signal from said video playback device, with keeping a distance between a wearer of said apparatus and said screen display portion at a constant value or moved forward or backward in front of said wearer.

5. A head-mounted display system for causing an image signal from a video playback device to be displayed on a screen display portion provided in a head-mounted display apparatus and for causing said screen display portion to move based on a control signal output from said video playback device, said head-mounted display system comprising:

a driving means for moving said screen display portion in any one of directions selected from a lateral direction, a vertical direction, and a diagonal direction that is synthesized by said lateral direction and said vertical direction, with keeping a distance between a wearer of said apparatus and said screen display portion maintained at a constant value;

a detecting means for detecting a movement of said head-mounted display apparatus; and a control means for controlling so as to move said screen display portion by means of said driving means in response to a detection signal output from said detecting means and said control signal output from said video playback device.

6. A head-mounted display system for causing an image signal from a video playback device to be displayed on a screen display portion provided in a head-mounted display apparatus and for causing said screen display portion to move based on a control signal output from said video playback device, said head-mounted display system comprising:

a driving means for moving said screen display portion in any one of directions selected from a lateral direction, a vertical direction, and a diagonal direction that is synthesized by said lateral direction and said vertical direction, with keeping a distance between a wearer of said apparatus and said screen display portion at a constant value and for moving said screen display portion forward or backward in front of said wearer;

a detecting means for detecting movement of said head-mounted display apparatus; and a control means for controlling so as to move said screen display portion by means of said driving means in response to a detection signal output from said detecting means and said control signal output from said video playback device.

7. The head-mounted display system according to claim 6, wherein said control means has a means to output a feedback signal to said video playback device based on a detection result of said detecting means and to carry out a display of an image based on control signal output from said video playback device.

8. The head-mounted display system according to claim 6, wherein said control means controls a movement of said screen display portion at a predetermined speed.

9. The head-mounted display system according to claim 6, wherein a bidirectional communication between said video playback device and said head-mounted display apparatus is performed in response to a detection result obtained by said detecting means.

* * * * *